(12) United States Patent
Carruthers

(10) Patent No.: US 10,086,424 B2
(45) Date of Patent: Oct. 2, 2018

(54) HELIX TOOL LOCKING SYSTEM

(71) Applicant: ADMC Holding, LLC, Lebanon, OH (US)

(72) Inventor: Andrew Ian Carruthers, Milnthorpe (GB)

(73) Assignee: ADMC HOLDING, LLC, Lebanon, OH (US)

( * ) Notice: Subject to any disclaimer, the term of this patent is extended or adjusted under 35 U.S.C. 154(b) by 412 days.

(21) Appl. No.: 14/877,782

(22) Filed: Oct. 7, 2015

(65) Prior Publication Data
US 2017/0100763 A1    Apr. 13, 2017

(51) Int. Cl.
B21D 37/04 (2006.01)
B21D 7/04 (2006.01)

(52) U.S. Cl.
CPC .............. B21D 37/04 (2013.01); B21D 7/04 (2013.01)

(58) Field of Classification Search
CPC .......... B21D 7/02; B21D 7/022; B21D 37/02; B21D 37/04; B21D 37/12; B21D 37/14; B23Q 3/157; B23Q 3/18
See application file for complete search history.

(56) References Cited

U.S. PATENT DOCUMENTS

| 4,834,596 | A | 5/1989 | Hollifield et al. |
| 5,593,258 | A | 1/1997 | Matsumoto et al. |
| 7,360,385 | B1 | 4/2008 | Wohlenhaus et al. |
| 2010/0111624 | A1 | 5/2010 | Seibold |
| 2012/0180545 | A1 | 7/2012 | Wilson |
| 2014/0326036 | A1* | 11/2014 | Hayashi ............... B21D 5/0236 72/482.91 |
| 2015/0239084 | A1 | 8/2015 | Rose et al. |

FOREIGN PATENT DOCUMENTS

WO    WO00/30781    6/2000

* cited by examiner

Primary Examiner — Debra Sullivan
(74) Attorney, Agent, or Firm — Welsh Flaxman & Gitler LLC

(57) ABSTRACT

An assembly for removably securing a tool to an industrial machine. The assembly includes an assembly base portion that may be removably secured to the industrial machine. A tool main body may be integrated with the assembly base portion. A tool attachment unit is provided to transition the assembly between a secured configuration and an unsecured configuration. The tool main body is securely fixed to the assembly base portion in the secure configuration. The tool main body is separable from the assembly base portion in the unsecured configuration. The assembly base portion and the tool attachment unit are configured to accommodate a variety of different tool main bodies according to a desired application.

8 Claims, 9 Drawing Sheets

HELIX TOOL LOCKING SYSTEM

CROSS-REFERENCE

The entire contents of U.S. patent application Ser. No. 14/768,208 are incorporated by reference into this application.

FIELD OF INVENTION

The present invention relates to mechanisms for securing a tool to an industrial machine.

BACKGROUND

Industrial manufacturing and tooling machines may have a tool attached to perform a specific tooling action. The industrial machines may use different tools having different sizes or functions specific to a particular application. Presently, it is difficult and time-consuming to exchange one tool attached to an industrial machine with another tool to adapt the configuration of the industrial machine to a different application. In U.S. patent application Ser. No. 14/768,208, for example, a bend forming device is disclosed which has a bend forming member for bending profile sections about a bending axis. It is desirable to adapt the bend forming device to form bends having different shapes or sizes. Unfortunately, exchange of one bend forming member for a bend forming member of a different size may take a significant amount of time, resulting in added cost in labor and wasted manufacturing time. A solution is needed for facilitating quick and easy tool exchange on industrial machines. This is essential where the tool exchange process is to be automated.

DETAILED DESCRIPTION

Figure 1:
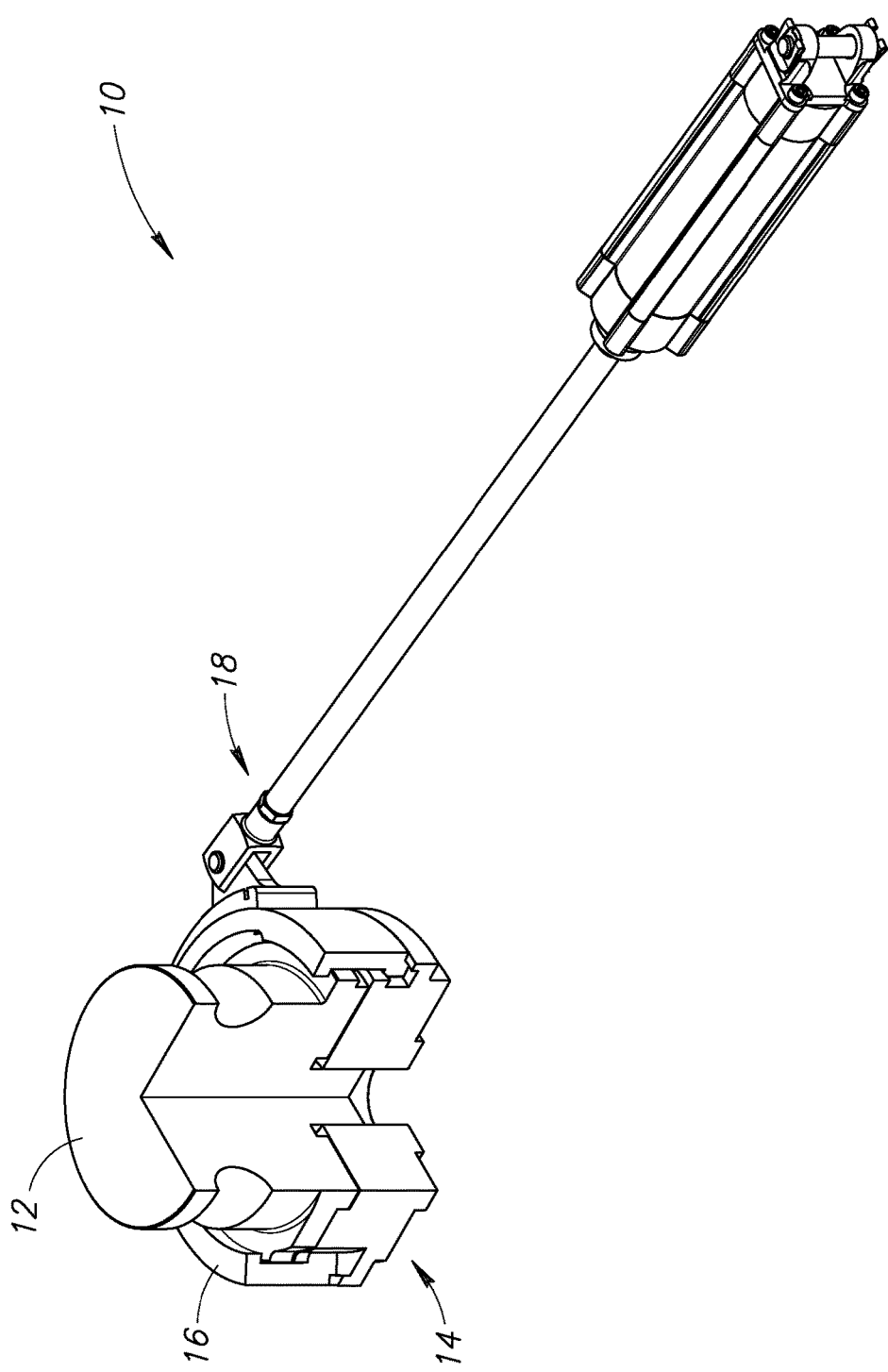
FIG. 1 illustrates a top front perspective view of a tool attachment assembly according to one embodiment.

A tool attachment assembly 10 in accordance with the present embodiment is shown in FIG. 1. The tool attachment assembly 10 includes a tool main body 12, an assembly base portion 14, a tool assembly attachment unit 16, and an attachment actuator 18. The tool main body 12 is a component of the tool attachment assembly 10 that is configured to perform the main tooling action of the tool attachment assembly 10. In the present embodiment, the tool main body 12 is a bend forming unit (as described in U.S. patent application Ser. No. 14/768,208) that bends an object around a bending axis Z (see FIGS. 2-3), by way of non-limiting example. The assembly base portion 14 is a component of the tool attachment assembly 10 which is configured to be integrally joined with or attached to a machine (not shown). The machine generates and/or applies a force which is transferred to the tool main body 12 through the assembly base portion 14 thereby causing the tool main body to perform the main tooling action. In the present embodiment, the assembly base portion 14 is configured to attach to a bending machine which applies a force to rotate the assembly base portion about the bending axis Z (see FIGS. 5-7). The tool attachment unit 16 is a component that rotates relative to the assembly base portion 14 between an unsecured position and a secured position. In the secured position, the tool main body 12 is securely attached to the assembly base portion 14 as a component of the tool attachment assembly 10 such that the tool main body 12 may not be easily separated from the tool attachment assembly. In the unsecured position, the tool main body 12 may be removed from and installed on the assembly base portion 14 of the tool attachment assembly 10 to facilitate quick and easy replacement of the tool main body according to the desired application.

Figure 2:
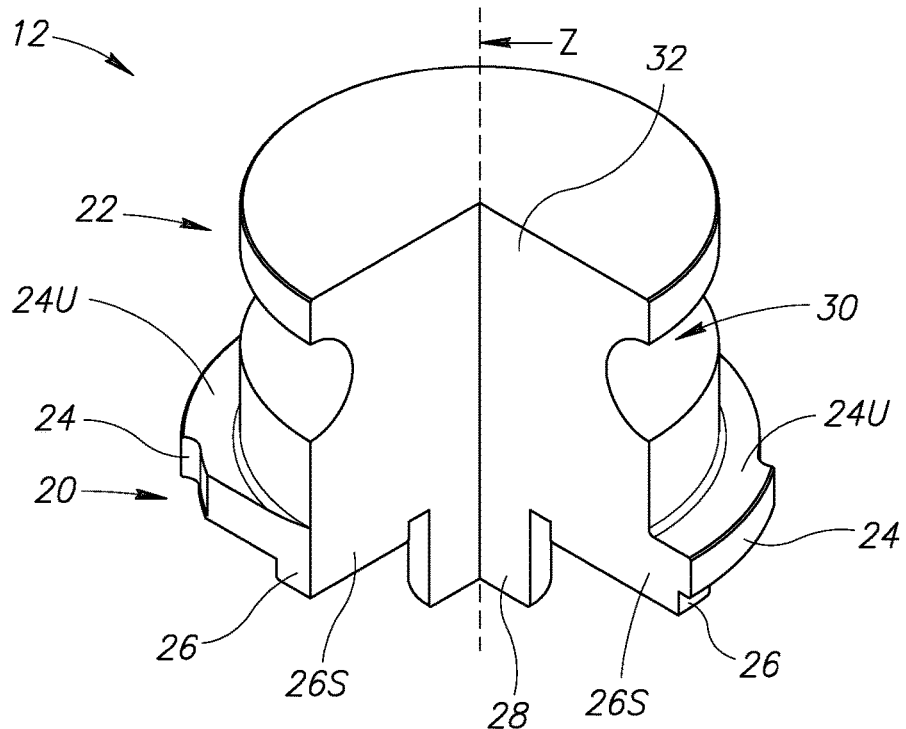
FIG. 2 illustrates a tool main body of the tool attachment assembly of FIG. 1.
Figure 3:
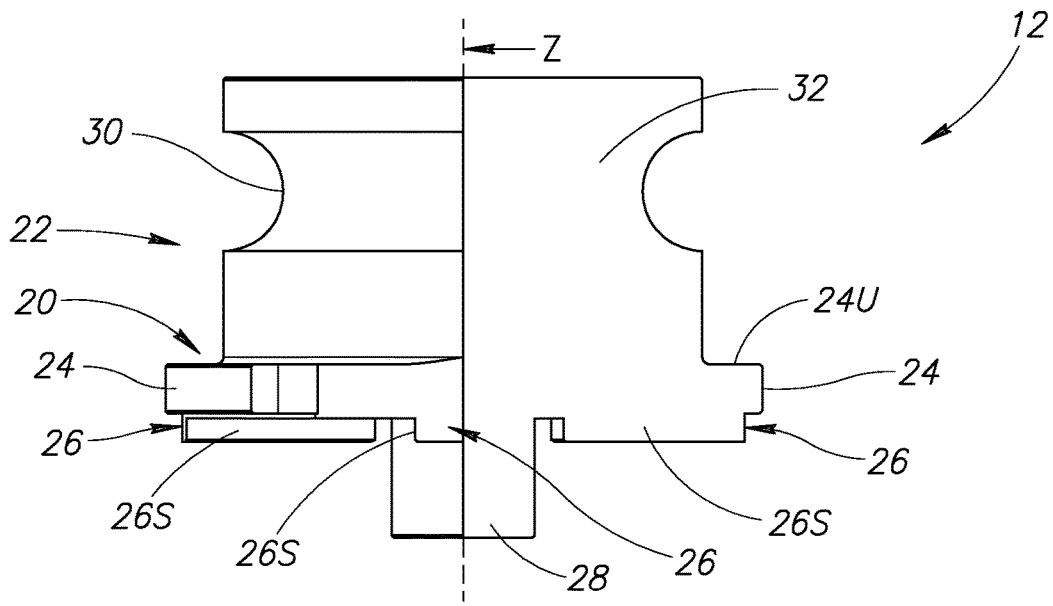
FIG. 3 illustrates a front elevational view of the tool main body of FIG. 2.
Figure 4:
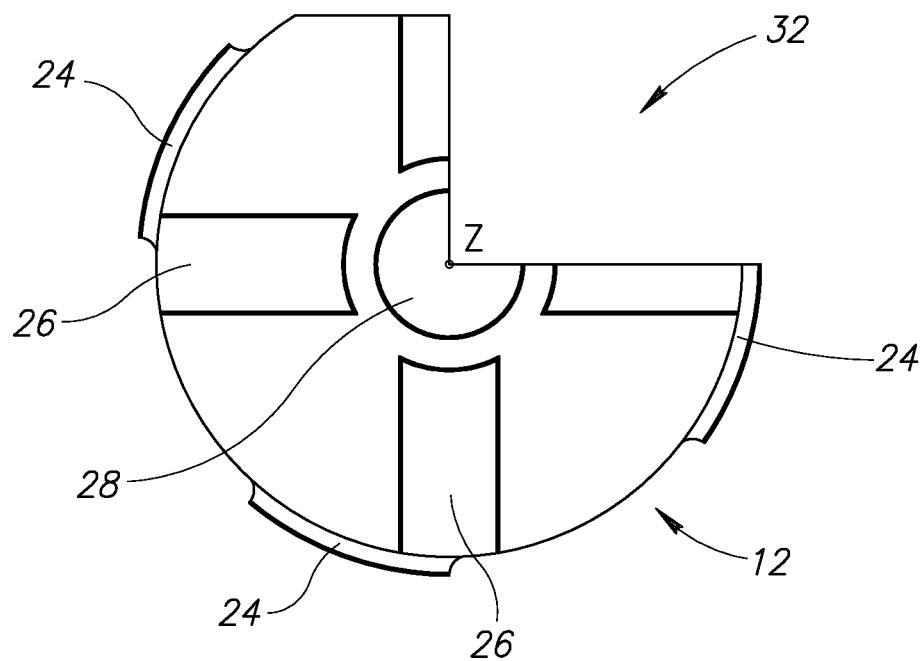
FIG. 4 illustrates a bottom plan view of the tool main body of FIG. 2.

The tool main body 12 includes a tool base portion 20 and a utility portion 22, as shown in FIGS. 2 and 3. The tool base portion 20 is configured to integrate with and receive a force applied to the assembly base portion 14. The tool base portion 20 is sized and shaped to mate with the tool assembly attachment unit 16. Attachment portions 24 protrude radially outward from the tool base portion 20, as shown in FIG. 4. In the present embodiment, the attachment portions 24 protrude from the tool base portion 20 in a direction orthogonal to the bending axis Z. The attachment portions 24 have an upper surface 24U that is substantially flat; however, the upper surface 24 may be angled to provide an end rotation position of the tool attachment unit 16, as described below. The peripheral edges of the attachment portions 24 may be shaped the same as the peripheral edge of the tool base portion 20. For example, the peripheral edges of the attachment portions 24 are rounded to follow the circular edges of the tool base potion 20, as shown in FIG. 4. A center post 28 may be provided to facilitate proper alignment of the tool main body 12 with the assembly base portion 14. In the present embodiment, the tool main body 12 is a monolithic component. In some embodiments, however, the tool main body 12 may be comprised of a plurality of parts.

Force-receiving portions 26 protrude downwardly from the tool base portion 20 and extend laterally outward from the bending axis Z. The force-receiving portions 26 have sidewalls 26S for receiving a force applied by a complementary part of the assembly base portion 14, as described below. In the present embodiment, the force-receiving portions 26 are configured to receive a rotational force from the assembly base portion 14 to bend an object about the bending axis Z. The force-receiving portions 26 are shaped and sized to transfer a large magnitude of force according to the desired application to perform any forming process known, including, but not limited to, bending, rolling, pressing, forming, shearing, stamping, flattening, stamping, threading, or extruding processes. In some embodiments, the force-receiving portion 26 may actuate a component of the tool main body 12 according to the desired application to perform machining processes including, but not limited to, cutting, milling, drilling, sawing, turning, planning, grinding, honing, or finishing processes. By way of non-limiting example, the force-receiving portions 26 may rotate a shaft extending through the tool main body 12, which causes the utility portion 22 to rotate for drilling or grinding process applications. As a further non-limiting example, the force-receiving portions 26 may be a system of gears which cause utility portion 22 when in the form of a saw blade to rotate for cutting applications.

The utility portion 22 is uniquely formed to perform the desired tooling action. In the present embodiment, the utility portion 22 is a bend forming member with a peripheral groove 30 extending circumferentially around the bending axis Z. The peripheral groove 30 terminates at a vertical recess 32, which may accommodate different clamping members, as described in U.S. patent application Ser. No. 14/768,208. The shape and function of the utility member 22 is not particularly limited, and may be configured to achieve any forming or machining process known. In other embodiments, the utility portions 22 may achieve other industrial processes such as welding, brazing, washing, or water jet cutting.

Figure 5:
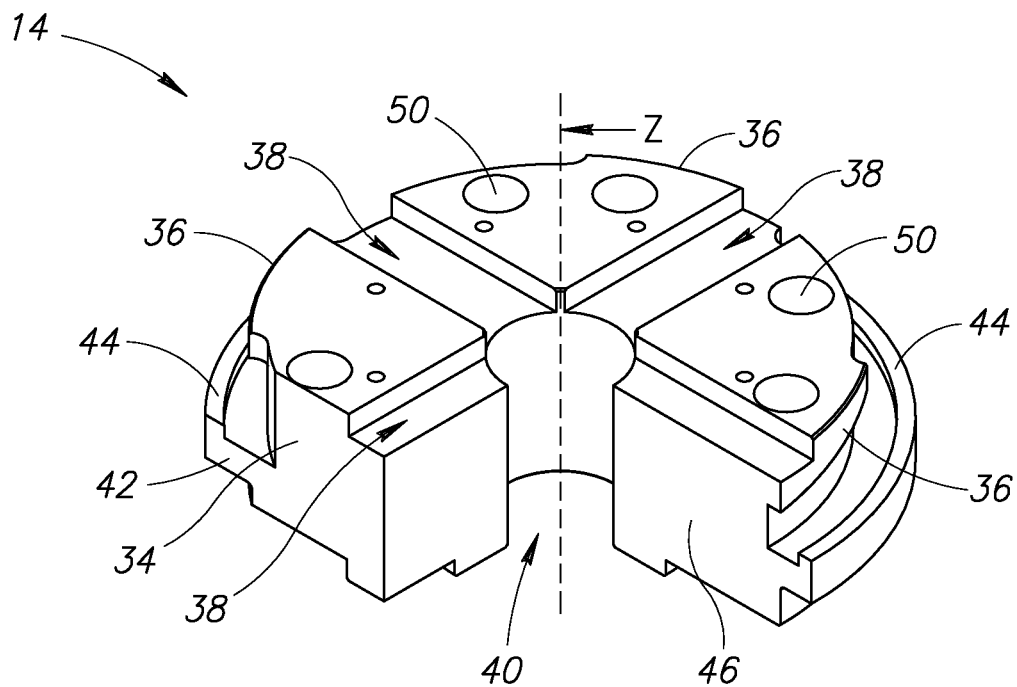
FIG. 5 illustrates a top perspective view of an assembly base portion of the tool attachment assembly of FIG. 1.
Figure 6:
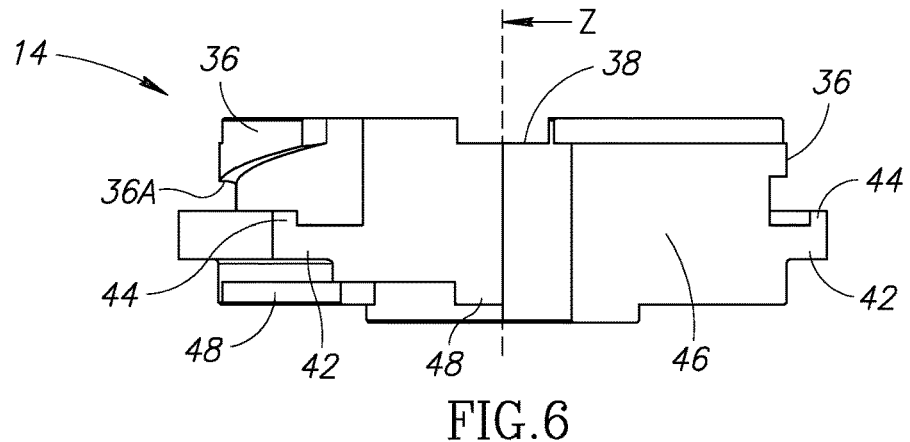
FIG. 6 illustrates a front elevational view of the assembly base portion of FIG. 5.
Figure 7:
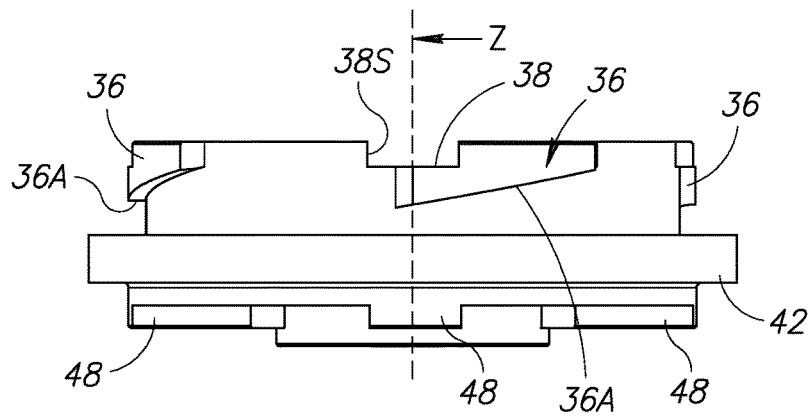
FIG. 7 illustrates a rear elevational view of the assembly base portion of FIG. 5.

The assembly base portion 14 includes a base body 34, second attachment portions 36, and force-application portions 38, as shown in FIGS. 5-7. The base body 34 is sized and shaped to mate with the tool assembly attachment unit 16. The base body 34 is configured to be assembled with and apply a force to the tool main body 12. The second attachment portions 36 extend laterally outward from the base body 34. In the present embodiment, the second attachment portions 36 protrude from the base body 34 in a direction orthogonal to the bending axis Z. Each of the second attachment portions 36 may have a lower side with an angled surface 36A, as seen in FIGS. 6 and 7. The angled surface 36A provides a surface that is the end rotation position of the tool attachment unit 16, as described below. The peripheral edges of the second attachment portions 36 may be shaped the same as the peripheral edge of the base body 34. For example, the peripheral edges of the second attachment portions 36 are rounded to follow the circular edges of the base body 34, as shown in FIG. 5. A center aperture 40 may be provided to receive the center post 28 to facilitate assembly of the tool main body 12 with the assembly base portion 14. In the present embodiment, the assembly base portion 14 has a vertical recess 46 to accommodate different clamping members, as described in U.S. patent application Ser. No. 14/768,208.

The force-application portions 38 recess downward from an upper surface of the assembly base portion 14. The force-application portions 38 have sidewalls 38S for applying a force against the force-receiving portions 26S. In the present embodiment, the force-application portions 38 are configured to apply a rotational force to the tool main body 12 to bend an object about the bending axis Z. The force-application portions 38 are shaped and sized to transfer a large magnitude of force according to the desired application to perform the functions described above with respect to the force-receiving portions 26. In the present embodiment, the force-receiving portions 26 are projecting portions that are configured to mate with the recessed force-application portions 38. In some embodiments, the force-application portions 38 may instead be projecting portions that are configured to mate with the force-receiving portions 26, which are recessed portions. That is, shapes of the force-application portions 38 and the force-receiving portions 26 may be inverted.

Figure 11:
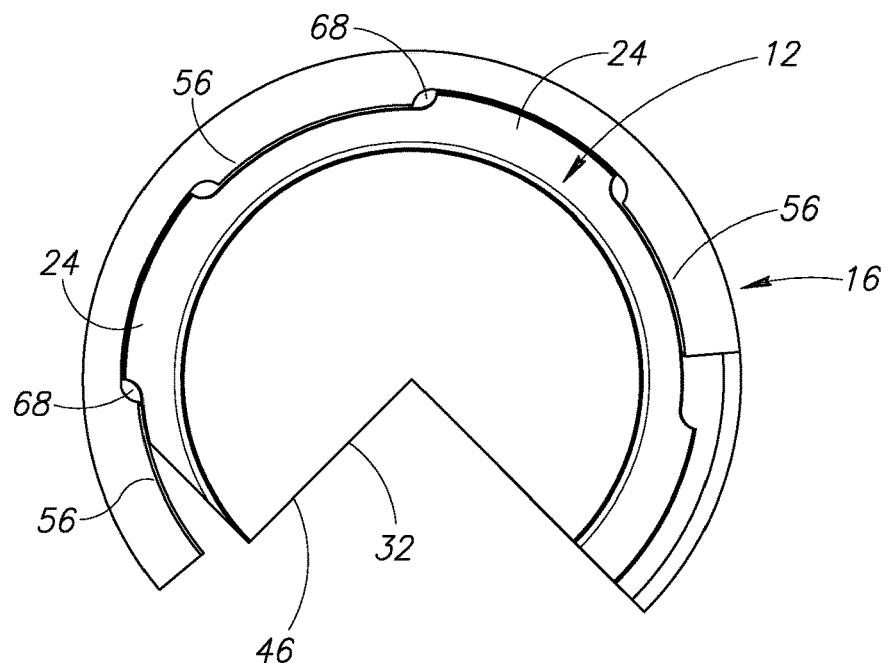
FIG. 11 illustrates a top perspective view of the tool attachment assembly of FIG. 1 in the unsecured configuration with a tool main body installed in the tool attachment assembly.

A lip 42 may extend laterally outward from the base body 34, and a raised portion 44 may extend upwardly from the lip. The raised portion 44 creates a groove providing radial support for the tool assembly attachment unit 16, as shown in FIG. 11. That is, the raised portion 42 provides a circumferential surface that helps to prevent the tool assembly unit 16 from moving laterally outward when the tool assembly unit is assembled with the assembly base portion 14.

The assembly base portion 14 is configured to be securely joined with a tooling machine thereby providing a platform to which the tool main body 12 may be removably secured. In the present embodiment, the assembly base portion 14 is provided with force-receiving portions 48 for receiving a rotational force applied by the tooling machine. The force-receiving portions 48 are shaped and sized to transfer a large magnitude of force according to the desired application to perform the functions described above with respect to the force-receiving portions 26. The force-receiving portions 48 are protruding portions that are configured to mate with a corresponding recessed portion of the tooling machine. The force-receiving portions 48 may be recessed portions or otherwise shaped to join with a corresponding portion of the tooling machine. As shown in FIG. 5, the assembly base portion 14 may also have apertures 50 through which bolts or other fasteners may be inserted to provide a secure connection between the assembly base portion 14 and the tooling machine.

Figure 8:
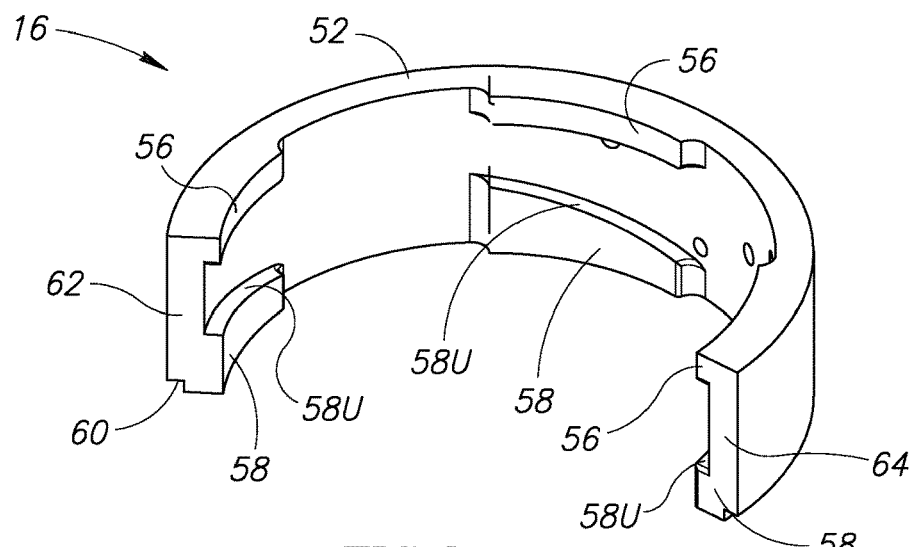
FIG. 8 illustrates a top perspective view of a tool attachment unit of the tool attachment assembly of FIG. 1.
Figure 9:
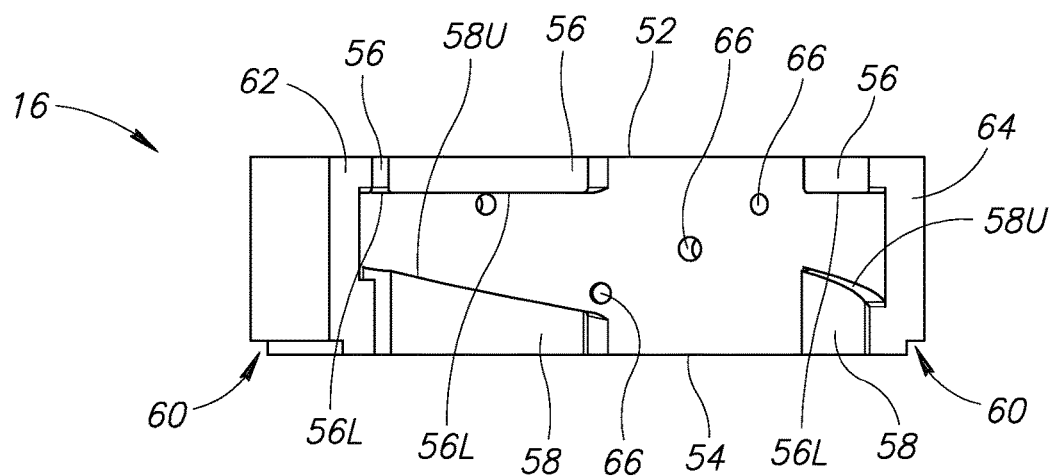
FIG. 9 illustrates a front elevational view of the tool attachment unit of FIG. 8.

The tool attachment unit 16 has a cylindrical body with a first axial side 52 and a second axial side 54, as shown in FIGS. 8 and 9. First protruding portions 56 protrude laterally inward from an inner peripheral surface of the tool attachment unit 16. Second protruding portions 58 protrude laterally inward from the inner peripheral surface of the tool attachment unit 16. The first protruding portions 56 are closer to the first axial side 52 than the second protruding portions 58. Conversely, the second protruding portions are closer to the second axial side 54 than the first protruding portions 56. The first protruding portions 56 may oppose the second protruding portions 58 at the same circumferential position of the tool attachment unit 16. In the present embodiment, each first protruding portion 56 has a flat lower surface 56L to complement the flat upper surface 24U of the attachment portions 24. Each second protruding portion 58 has an angled upper surface 58U to complement the angled surface 36A of the second attachment portions 36. A peripheral groove 60 is provided on the second axial side 54 to complement the raised portion 44 of the assembly base portion 14. Attachment points 66 may be provided on the cylindrical body of the tool attachment unit 16 to connect the attachment actuator 18 to the tool attachment unit. The attachment points 66 shown in FIG. 9 are through-holes into which bolts or other members may be inserted; however, it is not strictly necessary for the attachment points 66 to extend through the entire cylindrical body of the tool attachment unit 16. The attachment points 66 facilitate rotation of the tool attachment unit 16 according to movement of the attachment actuator 18, as described below.

In the present embodiment, the tool attachment unit 16 has a semi-cylindrical body with a first circumferential end 62 and a second circumferential end 64. When the tool attachment assembly 10 is integrated and the tool attachment unit 16 is in the secured position, as shown in FIG. 1, the gap between the first circumferential end 62 and the second circumferential end 64 accommodates different clamping members, as described in U.S. patent application Ser. No. 14/768,208. However, the tool attachment unit 16 may be a complete cylinder without the first circumferential end 62 and the second circumferential end 64 in embodiments where the tool attachment assembly 10 is not configured to accommodate different clamping members.

Figure 10A:
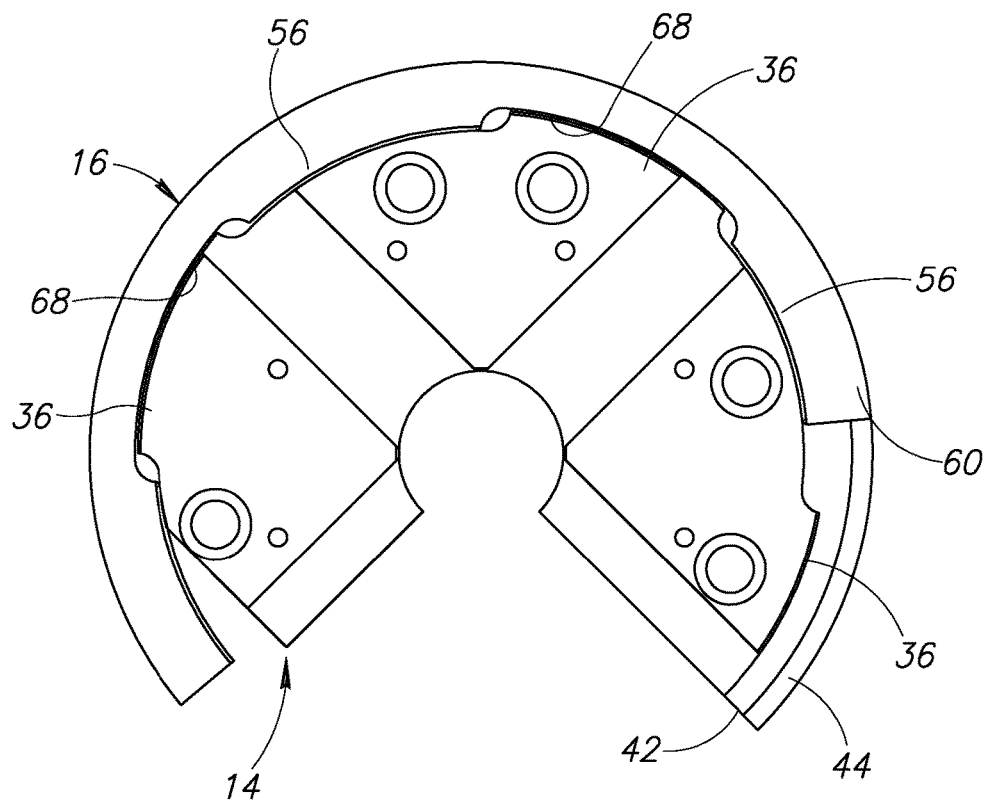
FIG. 10A illustrates a cross-sectional top plan view of the tool attachment unit attached to the assembly base portion.
Figure 10B:
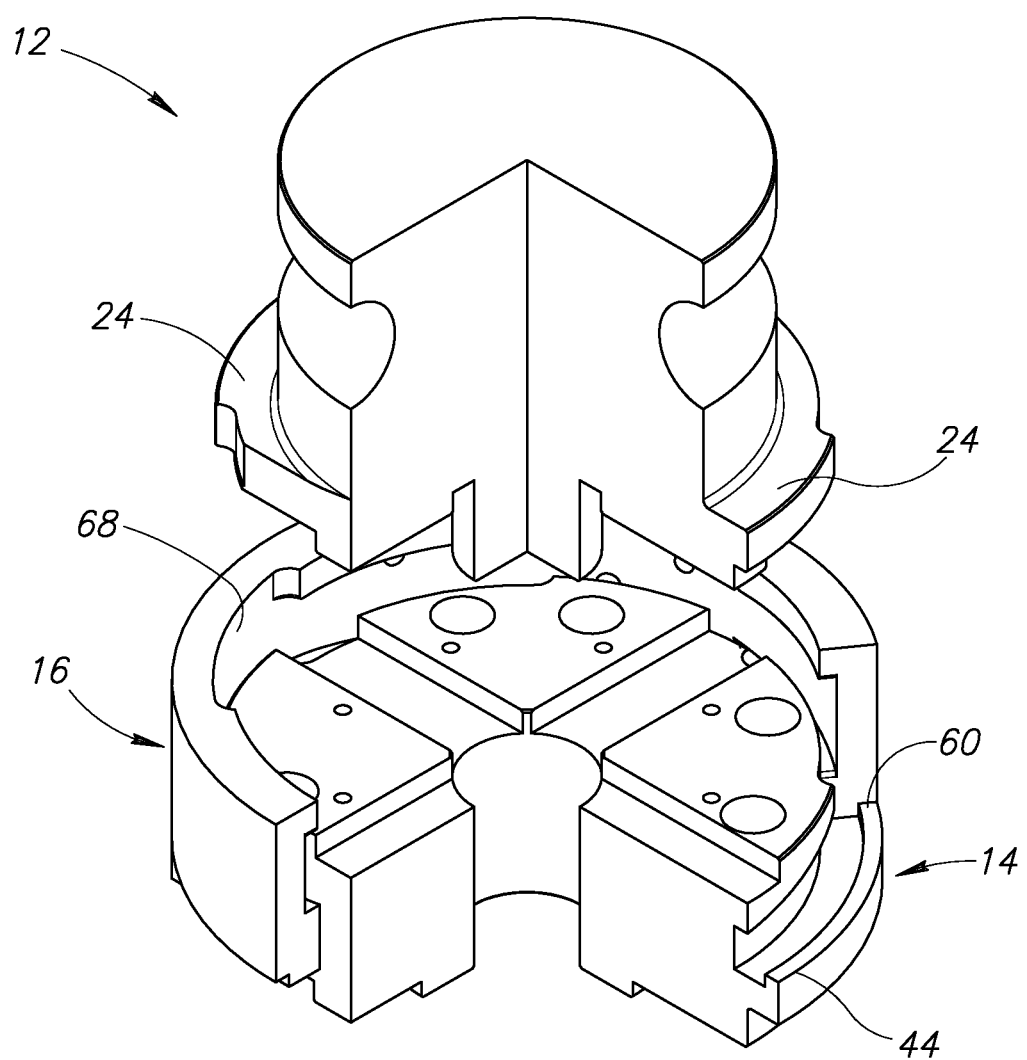
FIG. 10B illustrates a top perspective view of a tool attachment assembly of FIG. 1 in an unsecured configuration with a tool main body removed from the tool attachment assembly.

The tool attachment unit 16 may be separated from the assembly base portion 14 by rotating the tool attachment unit to a position where the second protruding portions 58 are not aligned with the second attachment portions 36 when viewed in cross-sectional plan view from above, as shown in FIG. 10A. In the present embodiment, the first protruding portions 56 are aligned with the second protruding portions 58 in an axial direction of the tool attachment assembly 16, as shown in FIG. 8. When the tool attachment unit 16 is in an unsecured position, as described below, the tool attachment assembly may therefore be separated from the assembly base portion 14. When the tool attachment unit 16 is attached to the assembly base portion 14, the peripheral groove 60 fits over the raised portion 44 to prevent the tool attachment unit from moving laterally relative to the assembly base portion, as shown in FIG. 10B.

Figure 12:
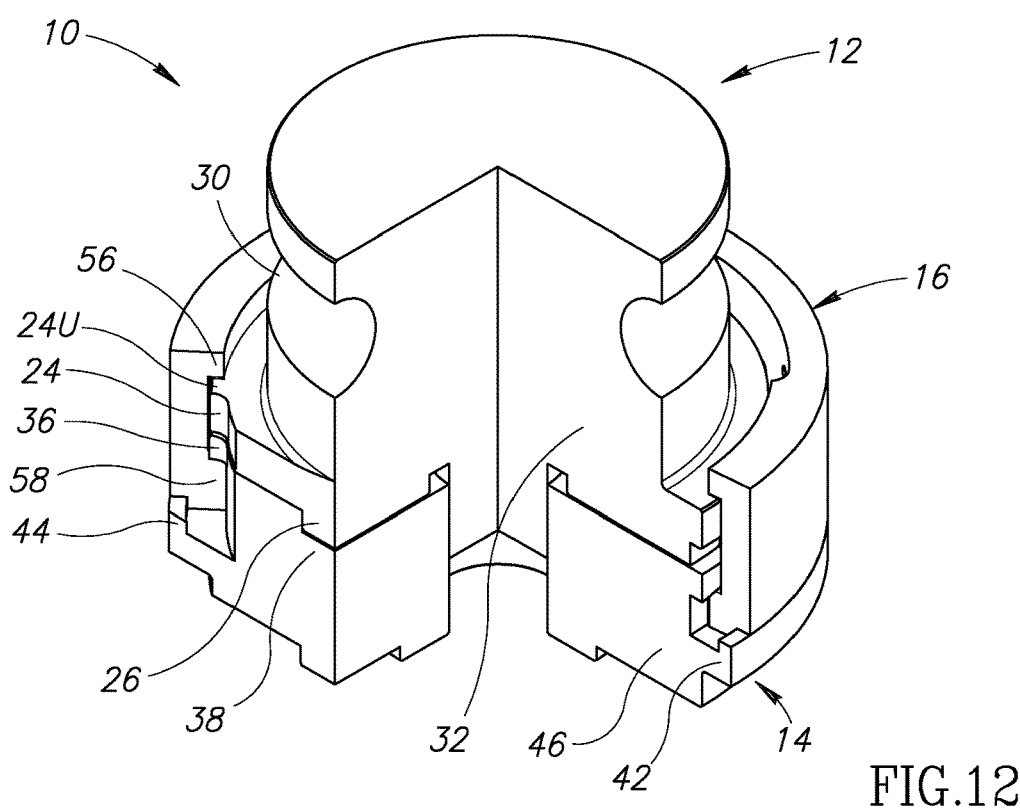
FIG. 12 illustrates a top perspective view of the tool attachment assembly of FIG. 1 in a secured configuration with a tool main body installed in the tool attachment assembly.
Figure 13:
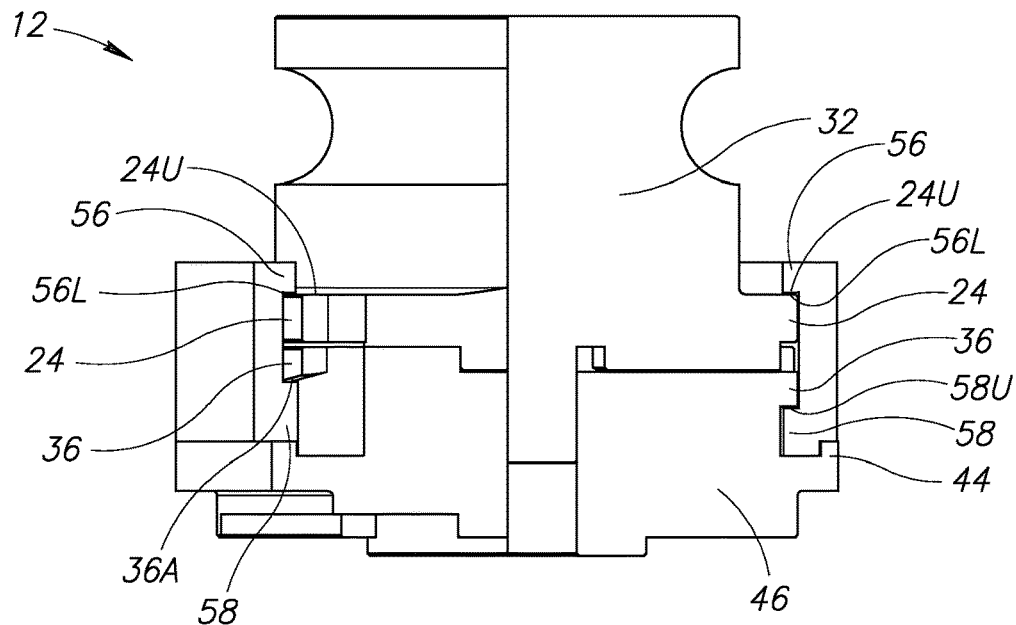
FIG. 13 illustrates a front elevational view of the tool attachment assembly of FIG. 1 in the secured configuration.
Figure 14:
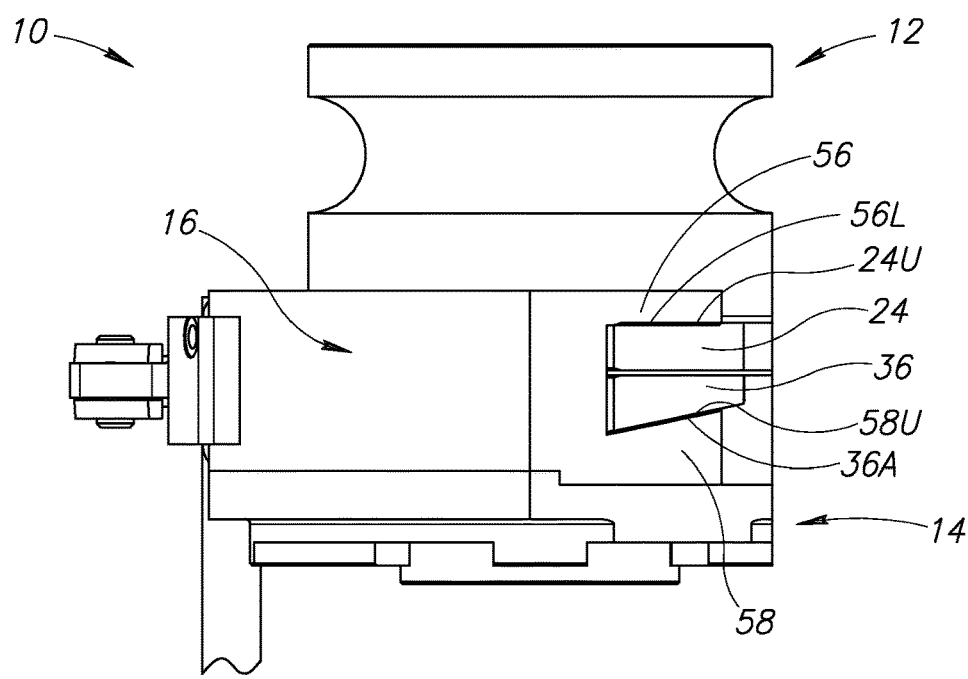
FIG. 14 illustrates a cross-sectional left side view of the tool attachment assembly of FIG. 1 in the secured configuration.

The tool attachment assembly 10 is configured to transition between an unsecured configuration where the tool main body 12 may be separated from (see FIG. 10B) or inserted into (see FIG. 11) the assembly base portion 14, and a secured configuration where a tool main body installed in the tool attachment assembly is securely attached to the assembly base portion, as shown in FIGS. 12-14. When the tool main body 12 is inserted into the tool attachment assembly 10, the force-receiving portions 26 of the tool main body should be aligned to engage with the force-application portions 38 of the assembly base portion 14. In the present embodiment, the force-receiving portions 26 fit into the force-application portions 38 to transfer a rotational force for bending; however, the force-receiving portions may otherwise engage with the force-application portions according to the desired application, as described above. When the tool main body 12 is inserted into the tool attachment assembly 10, the center post 28 may insert into the center aperture 40 to facilitate proper alignment. In the present embodiment, the tool main body 12 is properly aligned with the assembly base portion 14 when the vertical recess 32 of the tool main body is aligned with the vertical recess 46 of the assembly base portion. In some embodiments, the vertical recess 32 is not provided on the tool main body 12 and/or the vertical recess 46 is not provided on the assembly base portion 14. In particular, the tool attachment assembly 10 may not have the vertical recess 32 and the vertical recess 46 when the tool attachment assembly is not configured to accommodate different clamping members, as described in U.S. patent application Ser. No. 14/768,208.

When the tool attachment assembly 10 is in the unsecured configuration, the tool attachment unit 16 is in a rotational position where the first protruding portions 56 are not aligned with the attachment portions 24 of the tool main body 12 when viewed from above, as shown in FIG. 11. The first protruding portions 56 do not prevent separation of the tool main body 12 from the assembly base portion 14 in the unsecured configuration. When the tool attachment assembly is in the unsecured configuration, the tool attachment unit 16 may be in a rotational position where the second protruding portions 58 are not aligned with the second attachment portions 36 when viewed from above. When the second protruding portions 58 are not aligned with the second attachment portions 36, the tool attachment unit 16 may be separated from the assembly base portion 14. In the present embodiment, the tool attachment unit 16 is rotated in a counter-clockwise direction (when viewed from above) to transition the tool attachment unit from the secured position to the unsecured position.

When the tool attachment unit 16 is in the unsecured position, the tool main body 12 may be inserted into the tool attachment unit. As shown in FIG. 11, the attachment portions 24 may be inserted in gaps 68 of the tool attachment unit 16 between the first protruding portions 56. To secure the tool main body 12 in the tool attachment assembly 10 and lock them together, the tool attachment unit 16 is rotated from the unsecured position to the secured position. In the present embodiment, the tool attachment assembly 10 is configured such that the tool attachment unit 16 is rotated in a clockwise direction from the unsecured position to the secured position. However, the direction of rotation may be altered according to the configuration of the tool attachment assembly 10.

When the tool attachment assembly 10 is in the secured configuration, the lower flat surface 56L of at least one of the first protruding portion 56 may abut the upper surface 24U of a corresponding attachment portion 24 to prevent separation of the tool main body 12 from the tool attachment assembly 10. Additionally, the angled upper surface 58U of at least one of the second protruding portions 58 may abut the angled surface 36A of a corresponding second attachment portion 36 to prevent separation of the tool attachment portion 16 from the assembly base body 14. That is, the attachment portions 24 and the second attachment portions 36 are sandwiched in between the first protruding portion 56 and the second protruding portion 58 to securely assemble and lock the tool main body 12, the assembly base portion 14, and the tool attachment unit 16 together.

In the secured configuration, the angled surface 36A of the second attachment portions 36 prevents further rotation of the tool attachment unit 16 in one direction (i.e., the direction of rotation moving the tool attachment unit 16 into the secured position). In particular, the angled upper surface 58U of at least one of the second protruding portion 58 abuts the angled surface 36A of a corresponding second attachment portion 36, as shown in FIG. 14. Although the second protruding portion 58 and second attachment portion 36 have angled surfaces in the present embodiment, the first protruding portion 56 and the attachment portion 24 may alternatively or additionally have angled surfaces to prevent further rotation of the tool attachment unit 16 in the secured position. That is, the attachment portions 24 may have an angled upper surface 24U that abuts an angled lower surface 56L of the protruding portion 56 to prevent further rotation of the tool attachment portion 16 in the secured configuration. The angled upper surface 24U and the angled lower surface 56L may be provided instead of or in addition to the angled surface 36A of the second attachment portion 36 and the angled upper surface 58U of the second protruding portion, respectively.

Figure 15:
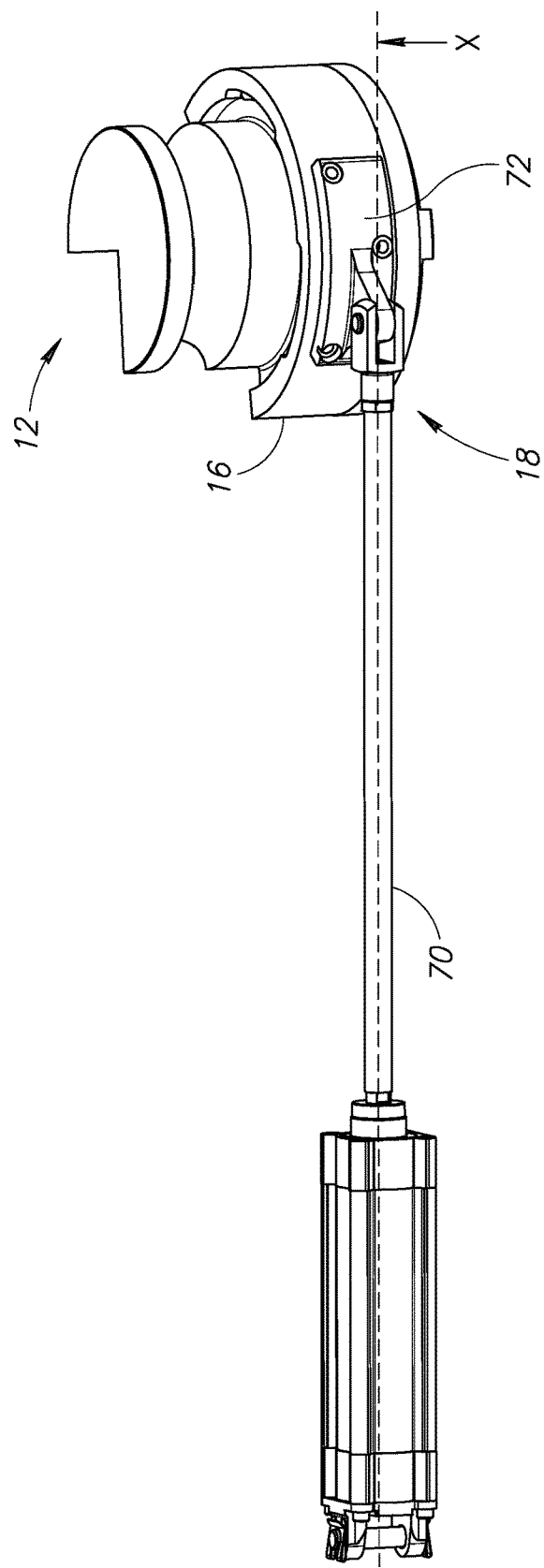
FIG. 15 illustrates a second top perspective view of the tool attachment assembly of FIG. 1.

The tool attachment unit 16 may be rotated between the secured position and the unsecured position either manually or by machine. In the present embodiment, the attachment actuator 18 moves linearly back and forth along an axis X to rotate the tool attachment unit 16 between the secured position and the unsecured position. An actuator arm 70 of the attachment unit 18 is pivotally attached to an actuator attachment portion 72, as shown in FIG. 15. The attachment portion 72 is attached to the tool attachment unit 16 via attachment points, as described above.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Accordingly, the invention is not limited except as by the appended claims.

What is claimed is:

1. A tool attachment assembly for removably securing a tool to a tooling machine, comprising:
   a tool main body including:
      a tool base portion configured to receive an application force;
      a utility portion configured to perform a desired tooling action; and
      a first attachment portion protruding outward from the tool base portion;
   an assembly base portion configured to be operatively connected to the tooling machine and receive the application force therefrom, the assembly base portion including:
      a base body;
      a second attachment portion protruding outward from the base body; and
      a force-application portion configured to transfer the application force to the tool base portion of the tool main body; and
   a tool attachment unit including:
      a body extending in an axial direction and having a first axial side and a second axial side opposite to the first axial side in the axial direction of the body, the body of the tool attachment unit being sized and shaped to fit on the base body of the assembly base portion;
      a first protruding portion extending inward from an inner periphery of the body, the first protruding portion being located toward the first axial side; and
      a second protruding portion extending inward from the inner periphery of the body, the second protruding portion being located toward the second axial side;
   wherein, when the body is fitted on the base body, the tool attachment unit is configured to rotate between (i) a secured position where the tool attachment portion secures the tool main body to the assembly base portion, and (ii) an unsecured position where the tool main body is removable from the assembly base portion, and wherein a raised portion extends in a first direction from the base body at a lateral distance from a center axis of the base body, wherein the second protruding portion of the tool attachment unit is retained between the raised portion and a central portion of the base body when the body is fitted on the base body.

2. The tool attachment assembly of claim 1 wherein, in the secured position, the first protruding portion abuts the first attachment portion and the second protruding portion abuts the second attachment portion, and in the unsecured position, the first protruding portion is spaced apart from the first attachment portion and the second protruding portion is spaced apart from the second attachment portion.

3. The tool attachment assembly of claim 1 wherein one of the first protruding portion and the second protruding portion has an angled surface, and, when the tool attachment unit is in the secured position, the angled portion prevents the tool attachment unit from rotating in one direction.

4. The tool attachment assembly of claim 1, further comprising:
   an attachment actuator attached to the tool attachment unit, the attachment actuator being configured to rotate the tool attachment unit between the secured position and the unsecured position.

5. The tool attachment assembly of claim 1 wherein the first protruding portion opposes the second protruding portion in the axial direction of the body.

6. A tool attachment assembly for removably securing a tool to a tooling machine, comprising:
   a tool main body including:
      a tool base portion configured to receive an application force;
      a utility portion configured to perform a desired tooling action; and
      a first attachment portion protruding outward from the tool base portion;
   an assembly base portion configured to be operatively connected to the tooling machine and receive the application force therefrom, the assembly base portion including:
      a base body;
      a second attachment portion protruding outward from the base body; and
      a force-application portion configured to transfer the application force to the tool base portion of the tool main body; and
   a tool attachment unit including:
      a body extending in an axial direction and having a first axial side and a second axial side opposite to the first axial side in the axial direction of the body, the body of the tool attachment unit being sized and shaped to fit on the base body of the assembly base portion;
      a first protruding portion extending inward from an inner periphery of the body, the first protruding portion being located toward the first axial side; and
      a second protruding portion extending inward from the inner periphery of the body, the second protruding portion being located toward the second axial side;
   wherein, when the body is fitted on the base body, the tool attachment unit is configured to rotate between (i) a secured position where the tool attachment portion secures the tool main body to the assembly base portion, and (ii) an unsecured position where the tool main body is removable from the assembly base portion,
   the tool main body further including a third attachment portion protruding outward from the tool base portion;
   the assembly base portion further including a fourth attachment portion protruding outward from the base body;
   the tool attachment unit further including:
      a third protruding portion extending inward from the inner periphery of the body at the first axial side; and
      a fourth protruding portion extending inward from the inner periphery of the body at the second axial side.

7. The tool attachment assembly of claim 6 wherein, in the secured position, the third protruding portion abuts the third attachment portion and the fourth protruding portion abuts the fourth attachment portion, and in the unsecured position, the third protruding portion is spaced apart from the third attachment portion and the fourth protruding portion is spaced apart from the fourth attachment portion.

8. A tool attachment assembly for removably securing a tool to a tooling machine, comprising:
   a tool main body including:
      a tool base portion configured to receive an application force;
      a utility portion configured to perform a desired tooling action; and
      a first attachment portion protruding outward from the tool base portion;
   an assembly base portion configured to be operatively connected to the tooling machine and receive the application force therefrom, the assembly base portion including:
      a base body;
      a second attachment portion protruding outward from the base body; and
      a force-application portion configured to transfer the application force to the tool base portion of the tool main body; and
   a tool attachment unit including:
      a body extending in an axial direction and having a first axial side and a second axial side opposite to the first axial side in the axial direction of the body, the body of the tool attachment unit being sized and shaped to fit on the base body of the assembly base portion;
      a first protruding portion extending inward from an inner periphery of the body, the first protruding portion being located toward the first axial side; and
      a second protruding portion extending inward from the inner periphery of the body, the second protruding portion being located toward the second axial side;
   wherein, when the body is fitted on the base body, the tool attachment unit is configured to rotate between (i) a secured position where the tool attachment portion secures the tool main body to the assembly base portion, and (ii) an unsecured position where the tool main body is removable from the assembly base portion;
   wherein, in the secured position, the first protruding portion abuts the first attachment portion and the second protruding portion abuts the second attachment portion, and in the unsecured position, the first protruding portion is spaced apart from the first attachment portion and the second protruding portion is spaced apart from the second attachment portion;
   the tool main body further including a third attachment portion protruding outward from the tool base portion;
   the assembly base portion further including a fourth attachment portion protruding outward from the base body;
   the tool attachment unit further including:
      a third protruding portion extending inward from the inner periphery of the body at the first axial side; and
      a fourth protruding portion extending inward from the inner periphery of the body at the second axial side;
   wherein, in the secured position, the third protruding portion abuts the third attachment portion and the fourth protruding portion abuts the fourth attachment portion, and in the unsecured position, the third protruding portion is spaced apart from the third attachment portion and the fourth protruding portion is spaced apart from the fourth attachment portion.

* * * * *